Sept. 19, 1961     H. T. HONIG     3,000,599
FISHING ROD HOLDER
Filed May 31, 1960
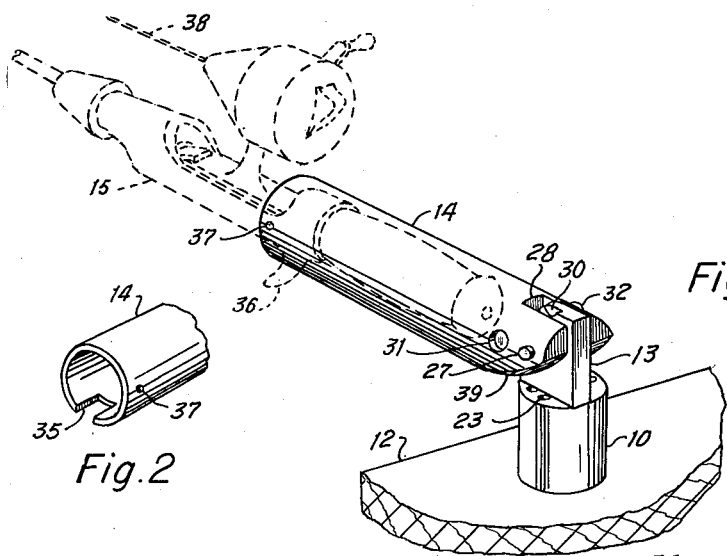
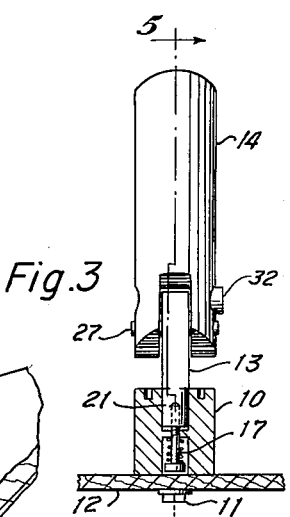
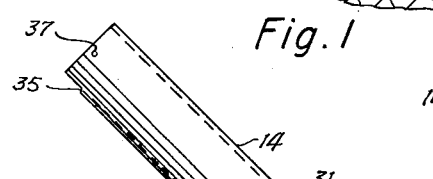
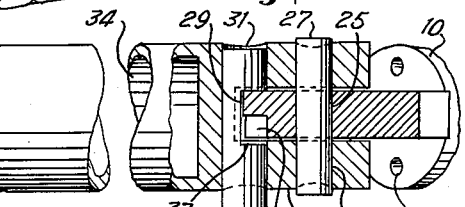
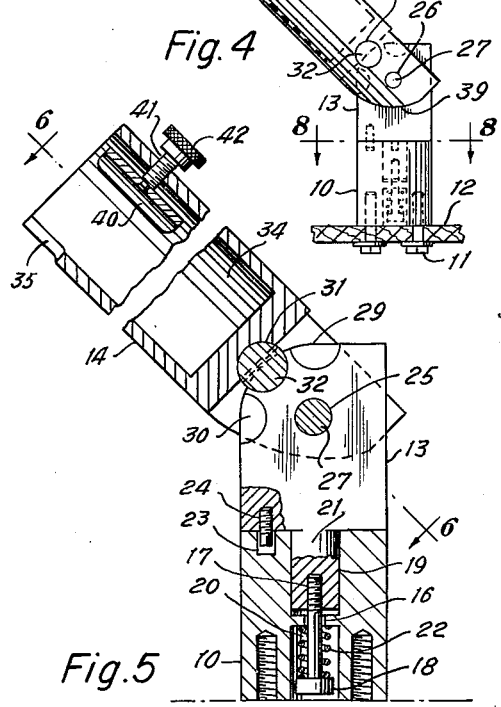
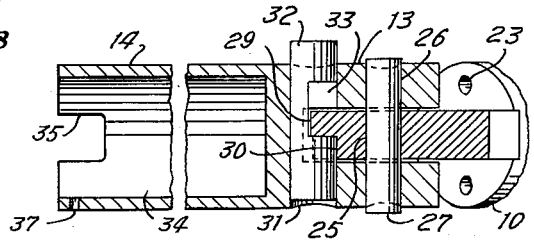
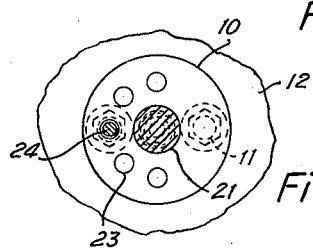
INVENTOR.
Henry T. Honig
BY
*Ashley & Ashley*
ATTORNEYS United States Patent Office 3,000,599
Patented Sept. 19, 1961

3,000,599
FISHING ROD HOLDER
Henry T. Honig, 5330 Royal Lane, Dallas, Tex.
Filed May 31, 1960, Ser. No. 32,659
6 Claims. (Cl. 248—38)

This invention relates to new and useful improvements in fishing rod holders.

One object of the invention is to provide an improved holder for fishing rods which is so constructed that a rod may be removably supported in various positions and readily moved by one hand from position to position whenever desirable or necessary.

Another object of the invention is to provide an improved fishing rod holder which is adjustable about upright and transverse axes so as to be substantially universally adjustable for positively supporting a rod in any desired position for still fishing, trolling and transportation in a boat and which is of such construction that there is no interference with insertion and removal of the rod.

A particular object of the invention is to provide an improved fishing rod holder having a rod-receiving portion which is pivotal about a substantially horizontal axis for varying the vertical angularity of the rod and means operable by one hand for positively holding the pivotal portion in adjusted positions so as to facilitate manipulation of the rod and the removal of fish from its line.

A further object of the invention is to provide an improved fishing rod holder, of the character described, having a base portion rotatable about an upright axis to permit swinging of the rod relative to a boat or other support and spring-pressed means for positively holding the rotatable base portion in adjusted positions and permitting movement thereof by one hand.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a perspective view of a fishing rod holder, constructed in accordance with the invention, mounted on a support and supporting a fishing rod shown in broken lines, FIG. 2 is a perspective view of the outer end portion of the holder, FIG. 3 is a rear elevational view, partly in section, of the holder, FIG. 4 is a side elevational view of the holder, FIG. 5 is an enlarged, longitudinal, sectional view, taken on the line 5—5 of FIG. 3.

FIG. 6 is a longitudinal, sectional view, taken on the line 6—6 of FIG. 5.

FIG. 7 is a view, similar to FIG. 6, showing the pivotal portion of the holder unlatched for movement to another position, and FIG. 8 is a cross-sectional view, taken on the line 8—8 of FIG. 4.

In the drawings, the numeral 10 designates the upright, cylindrical body or lower base member of a fishing rod holder which is adapted to be fastened by longitudinal screws 11 to a support 12, such as a part of a boat. An upper base element or overlying member 13, in the form of an upright, flat bar or plate, is rotatably connected to the body 10 and has a socket element or rod-receiving member 14 pivotally attached thereto. As shown by the broken lines 15, the handle of a fishing rod is adapted to be engaged in the socket element 14.

An axial, cylindrical opening 16 extends through the body for receiving an upstanding pin or screw 17 having an enlarged head 18 on its lower end (FIG. 5). The upper and lower end portions of the opening 16 are enlarged in diameter to provide counterbores or recesses 19 and 20 which are of appreciable depth or length so as to have contiguous inner ends or bottoms, whereby the medial portion of said opening is of little length and provides an annular shoulder or partition for separating the recesses. An upright, cylindrical pintle or shank 21 depends from the member 13 for rotatable engagement in the upper recess 19 and is confined therein by having the screw 17 threaded into its lower end with the head 18 disposed in the lower recess 20. The member 13 is constantly urged downwardly or toward the body 10 by a helical spring 22 which is confined upon the screw between its head and the annular partition. As shown most clearly in FIG. 8, a plurality of cylindrical apertures or sockets 23 is formed in the upper surface of the body and are adapted to receive a projection, such as a pin 24 screwthreaded in and depending from the lower surface of the member. The sockets 23 are arranged in a semicircle concentric to the opening 16 and, when engaged by the pin 24, lock the member 13 against rotation relative to the body. By pulling the member upwardly, the pin is disengaged to permit rotation of said member and engagement of said pin with another socket.

Alined, substantially horizontal openings 25 and 26 extend transversely through the outer end portion of the member 13 and the inner end portion of the socket element 14, respectively, for receiving a pivot pin 27 (FIGS. 4–7). The inner end portion of the socket element is bifurcated to provide an upright slot 28 for receiving the upper end portion of the member, the inner corner of which has an arcuate or curved margin or surface 29 swung on a radius about the axis of its opening 25 for closely clearing the bottom of the slot upon pivoting of said element. At least three semi-circular pockets or recesses 30 are formed in the arcuate surface 29 and extend transversely through one-half, more or less, of the member 13 whereby one margin of said surface is continuous and unbroken. For registering with the pockets 30, the element 14 has a transverse opening 31 intersecting the inner portion of its slot 28. A cylindrical latch element or pin 32 is slidably mounted in the opening 31 for engagement with the pockets to lock the element against pivotal movement and has a longitudinal groove or recess 33, which may be arcuate in cross-section, for clearing the continuous, unbroken margin of the surface 29. The length of the groove 33 is substantially equal to the width of the member 13 whereby the latch pin 32 may be slid into and out of the pockets. When the latch pin is slid to the left as shown in FIG. 7, its groove is alined with the member and the socket element is free to pivot relative thereto. The element may be locked against movement by sliding the latch pin to the right when one of the pockets 30 registers with the opening 31 (FIGS. 5 and 6). Since the pin 32 is freely slidable, it may be released and engaged by the fingers of the hand by which the element 14 is pivoted from one position to another. It is noted that the length of the latch pin is greater than the width of the socket element whereby said pin projects from one of the openings 26.

The socket element 14, which is preferably cylindrical, has a cylindrical bore or socket 34 extending from its outer end to a point adjacent its slot 28 for receiving the handle of the fishing rod 15. A notch 35 is formed in the outer end of the socket element to accommodate the depending finger piece 36, shown in broken lines, of the handle and prevent turning of the rod in the socket 34. The outer end portion of the element 14 may be provided with an orifice 37 for engagement by the fishhook (not shown) of the line 38, shown in broken lines. As shown by the numeral 39, the inner portion of the socket element adjacent its slot may be bevelled or rounded to eliminate sharp corners.

When fishing, the socket element is usually disposed at an inclination as shown in FIGS. 4 and 5 so as to elevate the outer end of the rod 15. In this position, it is virtually impossible to accidentally dislodge the handle from the socket 34, since any pull on the line 38 is downward or transversely of said socket whereby said handle is canted relative thereto and binds against the wall thereof. It is noted, however, that the handle may be readily inserted into and removed from the socket and that, in many instances, the element 14 may be used in a horizontal or an upright position. For example, when the holder is mounted on a boat and it is desired to move the boat, the socket element may be swung inwardly to dispose the rod in said boat by lifting and rotating the member 13 relative to the base 10 and said element may be pivoted downwardly or upwardly. One hand may be employed to lift and rotate the member as well as pivot the socket element from one position to another. It is only necessary to slide the latch pin 32 in order to unlock the element for pivotal movement. Due to the plurality of sockets 23 in the body, the member 13 may be turned to dispose the socket element and rod longitudinally of or transversely or at an angle to the boat. Its simplicity of construction permits a number of holders to be mounted on a boat without interfering with normal use of the boat.

As shown in FIG. 5 only, a clamp member or plate 40 may be mounted in the socket 34 of the element 14 for frictional engagement with the handle of the fishing rod 15 to positively prevent accidental dislodging of said handle. The clamp plate 40 is arcuate in cross-section so as to conform to the curvatures of the handle and socket, and is swivelled on the inner end of an adjusting screw 41 which is screwthreaded through the wall of the element. An enlarged head or knob 42 is carried by the outer end of the screw 41 to facilitate turning thereof for tightening and loosening the clamp plate.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fishing rod holder including a base, a member overlying and rotatably connected to the base, means holding the member against rotation relative to said base, a socket member for receiving the handle of a fishing rod and pivotally attached to said rotatable member for movement about a substantially horizontal axis, one of the members having a surface curved in an arc about the pivot axis of the socket member, the surface having a plurality of recesses extending transversely thereof and partly therethrough, and a latch element carried by and movable transversely of the other of said members for selective engagement with the recesses to secure said socket member in adjusted positions and having a recess for alinement with said surface to permit pivotal movement of said socket member.

2. A fishing rod holder as set forth in claim 1 wherein the latch element is in the form of a slidable pin and its recess is in the form of a groove extending longitudinally thereof.

3. A fishing rod holder including a base, a member overlying the base, spring-pressed means rotatably connecting the member to said base, a pin extending from one of the adjacent surfaces of said member and base, the other of said surfaces having sockets arranged in an arc about the axis of rotation of said member for selective engagement by the pin to hold said member against rotation relative to said base, a socket member for receiving the handle of a fishing rod and pivotally attached to said rotatable member for movement about a substantially horizontal axis, one of the members having a plurality of spaced recesses arranged in an arc about the pivotal axis, and a latch element carried by the other of said members for selective engagement with the recesses to secure the socket member in adjusted positions.

4. A fishing rod holder including a base member, a socket member for receiving the handle of a fishing rod and pivotally attached to the base member for movement about a substantially horizontal axis, a surface on one of the members curved in an arc about the pivot axis and having spaced recesses extending transversely thereof and partly therethrough, and a latch element carried by and movable transversely of the other of said members for selective engagement with the recesses to secure the socket member in adjusted positions and having a recess for alinement with the surface to permit pivotal movement of said socket member.

5. A fishing rod holder as set forth in claim 4 wherein the latch element is in the form of a slidable pin and its recess is in the form of a groove extending longitudinally of its medial portion.

6. A fishing rod holder including a base member, a socket member for receiving the handle of a fishing rod and pivotally attached to the base member for movement about a substantially horizontal axis, a surface on said base member curved in an arc about its pivot axis and having a plurality of spaced recesses extending transversely thereof and partly therethrough, and a latch pin carried by and slidable transversely of the socket member for selective engagement with the recesses to secure said socket member in adjusted positions, the latch pin having a longitudinal groove in its medial portion for alinement with the surface to permit pivotal movement of said socket member.

References Cited in the file of this patent

UNITED STATES PATENTS

| | | |
|---|---|---|
| 1,860,853 | Cuthbert | May 31, 1932 |
| 1,985,985 | Gerline | Jan. 1, 1935 |
| 2,414,358 | Calway | Jan. 14, 1947 |